(12) United States Patent
Taylor (10) Patent No.: US 11,971,581 B2
(45) Date of Patent: Apr. 30, 2024

(54) OPTICAL FIBRE CABLE CONNECTOR ASSEMBLY

(71) Applicant: Sterlite Technologies Limited, Gurgaon (IN)

(72) Inventor: Chris Taylor, Gloucestershire (GB)

(73) Assignee: Sterlite Technologies Limited, Gurgaon (IN)

( * ) Notice: Subject to any disclaimer, the term of this patent is extended or adjusted under 35 U.S.C. 154(b) by 286 days.

(21) Appl. No.: 17/256,013

(22) PCT Filed: Nov. 14, 2019

(86) PCT No.: PCT/IN2019/050841
§ 371 (c)(1),
(2) Date: Dec. 24, 2020

(87) PCT Pub. No.: WO2020/100165
PCT Pub. Date: May 22, 2020

(65) Prior Publication Data
US 2021/0263227 A1    Aug. 26, 2021

(30) Foreign Application Priority Data
Nov. 14, 2018  (IN) .............................. 201811042735

(51) Int. Cl.
*G02B 6/36* (2006.01)
*G02B 6/38* (2006.01)
*G02B 6/44* (2006.01)
*H02G 3/06* (2006.01)
*H02G 15/013* (2006.01)

(52) U.S. Cl.
CPC ......... *G02B 6/3825* (2013.01); *G02B 6/4401* (2013.01); *H02G 3/06* (2013.01); *H02G 15/013* (2013.01)

(58) Field of Classification Search
CPC ...... G02B 6/3825; G02B 6/4401; G02B 6/38; H02G 3/06; H02G 15/013
See application file for complete search history.

(56) References Cited

U.S. PATENT DOCUMENTS

| | | | |
|---|---|---|---|
| 9,513,444 B2* | 12/2016 | Barnette, Jr. .......... | G02B 6/387 |
| 2009/0148101 A1* | 6/2009 | Lu ......................... | G02B 6/3821 |
| | | | 385/56 |
| 2016/0139346 A1* | 5/2016 | Bund .................... | G02B 6/3831 |
| | | | 385/56 |

* cited by examiner

*Primary Examiner* — Ellen E Kim
(74) *Attorney, Agent, or Firm* — Steven R. Fairchild; Michael J. Pennington (57) ABSTRACT

The present disclosure provides a protected cable connector assembly. The protected cable connector assembly includes a cable gland body, a gland nut, a grommet, an optical fibre cable, a protected connector and a protective grip. The cable gland body includes a first threaded portion, a second threaded portion and an unthreaded portion. The gland nut includes internal threads. In addition, the internal threads of the gland nut engage with threads of the first threaded portion of the cable gland body. Further, a total length of the gland nut is about 17.87 millimeters. The grommet is positioned partially inside the cable gland body. The protected cable connector enables the optical fibre cable to terminate into an optical fibre distribution box.

7 Claims, 6 Drawing Sheets

OPTICAL FIBRE CABLE CONNECTOR ASSEMBLY

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present disclosure relates to the field of optical cable connectors. More particularly, the present disclosure relates to a protected optical cable connector. The present application is based on, and claims priority from an Indian Application Number 201811042735 filed on 14 Nov. 2018 and a PCT application with application number PCT/IN2019/050841 filed on 14 Nov. 2019, the disclosure of which is hereby incorporated by reference herein.

Description of the Related Art

Over the last few years there has been a significant rise in the use of optical fibre cables. The optical fibre cables are employed for a variety of applications. However, the optical fibre cables are primarily employed for networking and communication applications. In networking and communication applications, it is frequently desirable to make connections between different pairs of optical fibres. A variety of equipment is used to make these connections between different pairs of optical fibres. The variety of equipment includes optical connectors. The optical connectors enable optical coupling of optical fibre cable with fibre termination box. It is important to ensure that the connections provided by optical connectors are sufficiently strong to withstand environmental disturbances and various loads. However, these optical connectors are not environmentally robust. In addition, these optical connectors are not water proof. Moreover, these optical connectors are not weather proof. Further, these optical connectors are not provided with protective or shielding arrangements.

In light of the above mentioned drawbacks, there exists a need of an environmentally robust connector that overcomes the above stated disadvantages.

BRIEF SUMMARY OF THE INVENTION

In an aspect of the present disclosure, the present disclosure provides a protected cable connector assembly for housing a protected cable connector. The protected cable connector assembly includes a cable gland body, a gland nut, a grommet, the optical fibre cable, the protected connector, and a protective grip. The cable gland body is a hollow cylindrical body. In addition, the cable gland body includes a first threaded portion, a second threaded portion and an unthreaded portion. Further, the first threaded portion corresponds to external threads over periphery of a first substantially cylindrical cross section of the cable gland body. Furthermore, the second threaded portion is at a second end of the first substantially cylindrical cross section of the cable gland body. Moreover, the second threaded portion corresponds to external threads over periphery of the first substantially cylindrical cross section of the cable gland body. Also, the unthreaded portion of the cable gland body corresponds to central non-threaded portion between the first threaded portion and the second threaded portion. The gland nut is a hollow cylindrical body. In addition, the gland nut includes internal threads. Further, the internal threads of the gland nut engage with threads of the first threaded portion of the cable gland body. Furthermore, the gland nut is characterized by a total length. Moreover, the total length of the gland nut (104) is about 17.87 millimeters. The grommet is positioned partially inside the cable gland body. In addition, the grommet facilitates the protected cable connector assembly to hold an optical fibre cable firmly. Further, the grommet is positioned partially inside the first end of the cable gland body. Furthermore, the grommet seals the first end of the cable gland body as the gland nut is fastened on the first threaded portion of the cable gland body. Moreover, the grommet has a cylindrical shape with a hollow circular cavity. The protected connector is affixed at a first open end of the optical fibre cable. In addition, the protected cable connector enables the optical fibre cable to terminate into an optical fibre distribution box. Further, the protected connector is affixed to the first open end of the optical fibre cable. The optical fibre cable includes the first open end. The first open end of the optical fibre cable is terminated into the fibre distribution box. In addition, the protected connector aligns the optical fibre cable with optical transmission element of the fibre distribution box.

The protected grip is a robust outer covering of the protected cable connector assembly. In addition, the protective grip prevents components of the protected cable connector assembly from slipping down the optical fibre cable. In addition, the protected cable connector assembly ensures proper alignment of the optical fibre cable to minimize optical loses. Further, the protected cable connector assembly ensures efficient axial alignment of optical fibres of the optical fibre cable. Furthermore, the protected cable connector assembly is characterized by a diameter. Moreover, the diameter of the protected cable connector assembly is about 20.4 millimeters. Also, the protected cable connector assembly enables improvement in a plurality of characteristics of the protected connector. Also, the plurality of properties of the protected connector includes mechanical characteristics, optical characteristics and physical characteristics.

A primary object of the present disclosure is to provide a protected cable connector assembly.

Another object of the present disclosure is to provide the protected cable connector assembly which is water proof.

Yet another object of the present disclosure is to provide the protected cable connector assembly which has a low cost.

Yet another object of the present disclosure is to provide the protected cable connector assembly compatible with standard connectors.

Yet another object of the present disclosure is to provide the protected cable connector assembly that is easily affixed with fibre distribution boxes.

Yet another object of the present disclosure is to provide the protected cable connector assembly that is simple in construction.

In an embodiment of the present disclosure, the protected cable connector assembly includes the fibre distribution box. The fibre distribution box includes an adapter. The adapter facilitates in termination of the optical fibre cable into the fibre distribution box.

In an embodiment of the present disclosure, the cable gland body is fastened with the fibre distribution box for enabling engagement of the protected connector and an adapter.

In an embodiment of the present disclosure, the optical fibre cable is received through the grommet into the cable gland body. In addition, the optical fibre cable is received through the grommet when the gland nut is loose. Further, the gland nut is fastened on the cable gland body to enable the grommet to completely seal and grip the optical fibre cable.

In an embodiment of the present disclosure, the cable gland body is fastened with the fibre distribution box to enable a protective housing for the protected connector. In addition, the protective housing of the protected connector eliminates transmission losses occurring during termination of the optical fibre cable.

In an embodiment of the present disclosure, the cable gland body is characterized by a first length, a second length and a third length. In addition, the first length is the length of the first threaded portion of the cable gland body. Further, the first length is measured from the first end of the cable gland body to the first end of the unthreaded portion. Furthermore, the second length is the length of the unthreaded portion of the cable gland body. Moreover, the second length is measured from the second end of the cable gland body to the second end of the unthreaded portion. Also, the third length is the length of the second threaded portion of the cable gland body. Also, the first length of the cable gland body is about 17.87 millimeters. Also, the third length of the cable gland body is about 10 millimeters. Also, sum of the first length, the second length and the third length is a total length of the cable gland body. Also, the total length of the cable gland body is about 55 millimeters.

In an embodiment of the present disclosure, the protected connector is characterized by negligible transmission loss due to reflection or misalignment of optical fibres. In addition, the protected connector aligns the optical fibre cable with optical transmission element of the fibre distribution box.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:

100. protected cable connector assembly.
102. Cable gland body.
104. Gland nut.
106. Grommet.
108. Protected connector.
110. Optical fibre cable.
112. Adapter.
114. Fibre distribution box.
116. Protective grip.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

Figure 1:
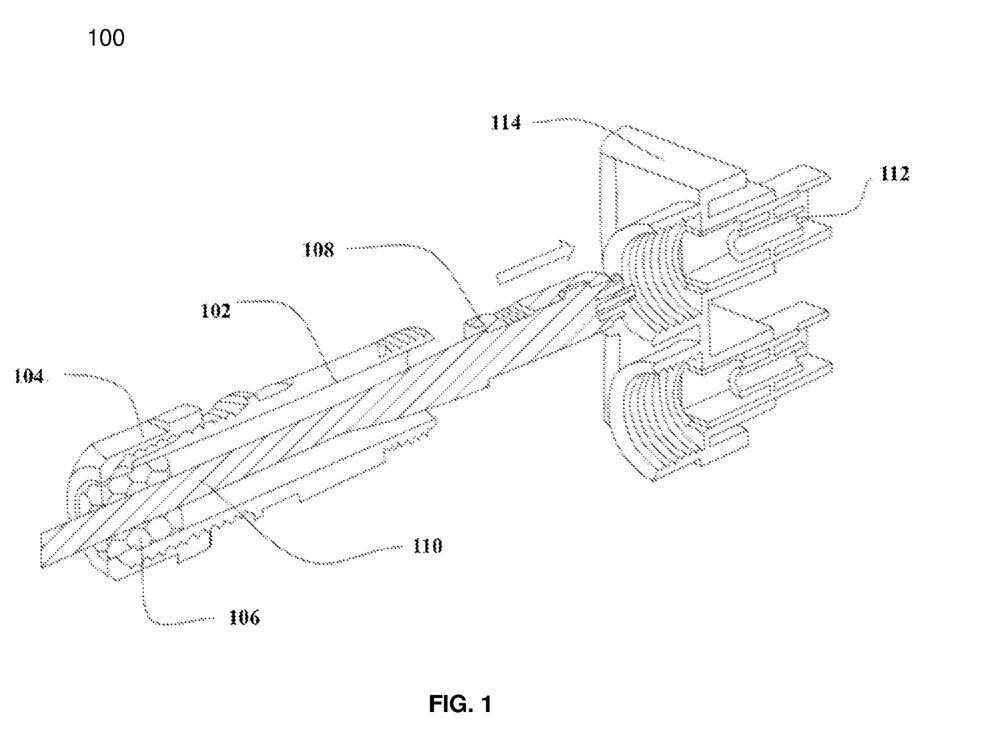
FIG. 1 illustrates an exploded cross sectional view of a protected cable connector assembly, in accordance with various embodiments of the present disclosure.
Figure 2:
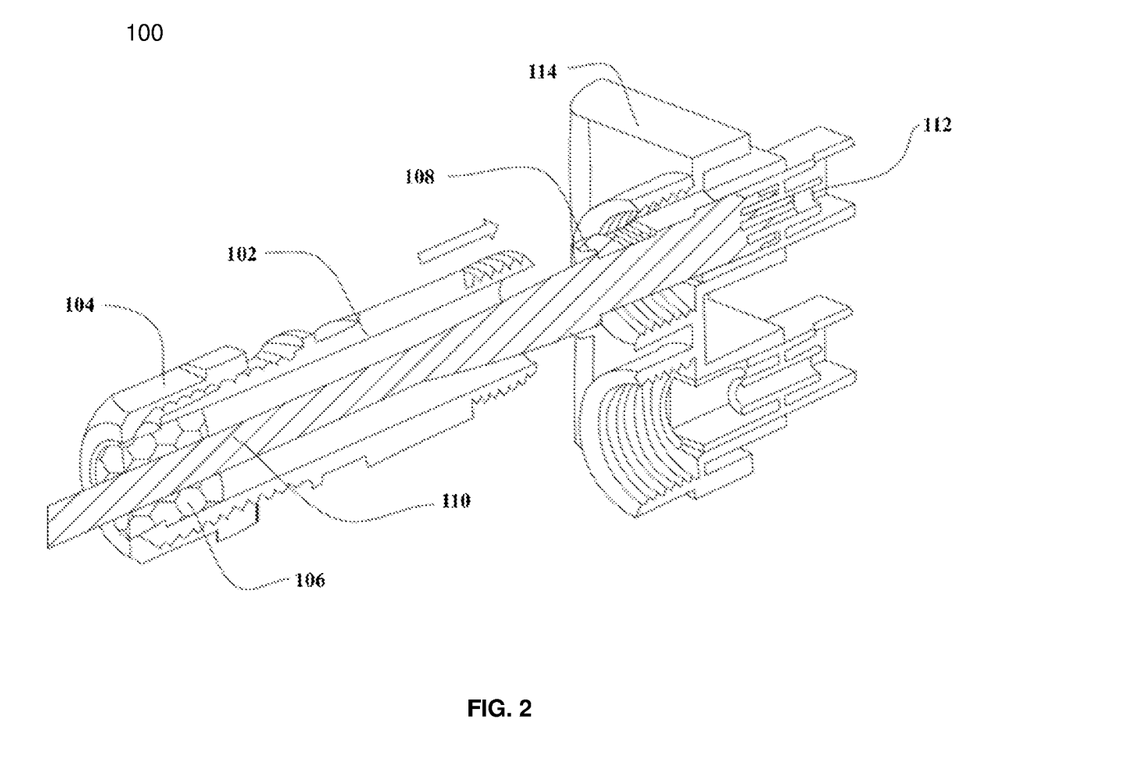
FIG. 2 illustrates a semi-exploded cross sectional view of the protected cable connector assembly, in accordance with various embodiments of the present disclosure.
Figure 3:
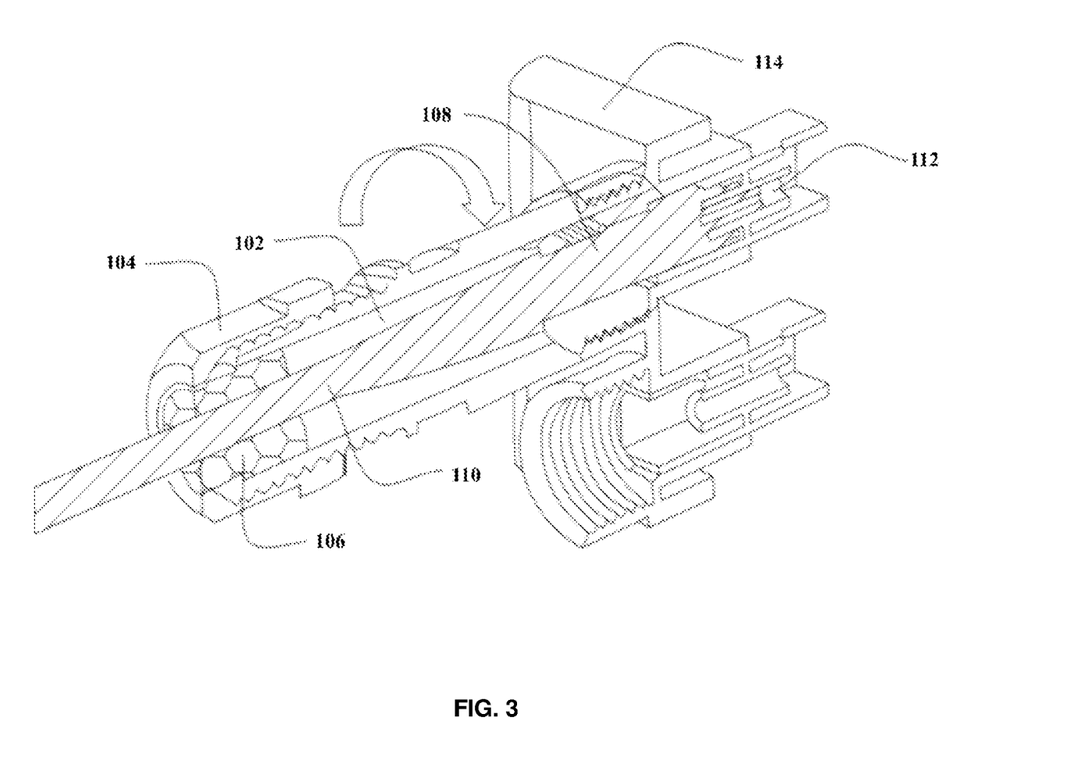
FIG. 3 illustrates a cross sectional view of the protected cable connector assembly, in accordance with various embodiments of the present disclosure.
Figure 4:
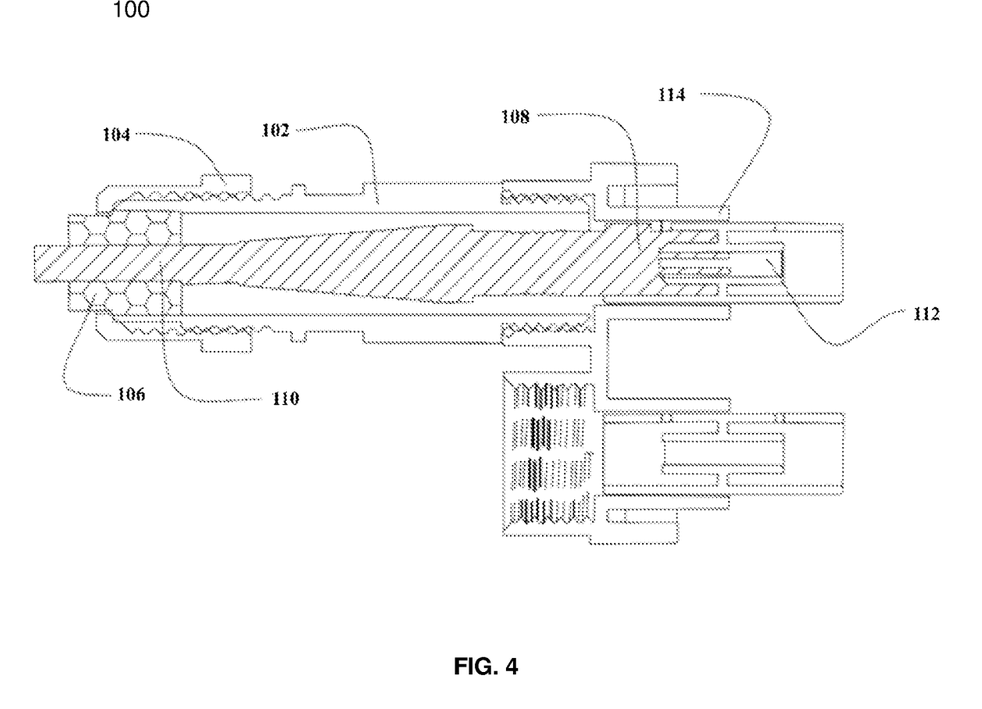
FIG. 4 illustrates side view of the protected cable connector assembly, in accordance with various embodiments of the present disclosure.
Figure 5:
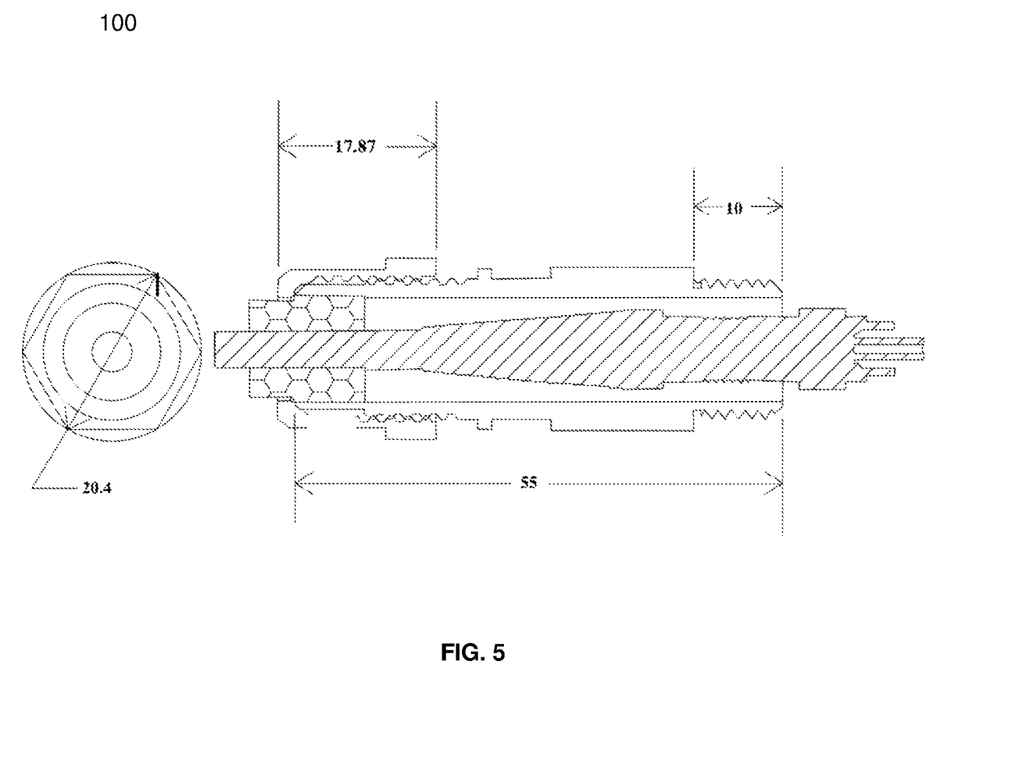
FIG. 5 illustrates side view of the protected cable connector assembly along with dimensions, in accordance with various embodiments of the present disclosure.

FIG. 1 illustrates an exploded cross sectional view of a protected cable connector assembly 100, in accordance with various embodiments of the present disclosure. FIG. 2 illustrates a semi-exploded cross sectional view of the protected cable connector assembly 100, in accordance with various embodiment of the present disclosure. FIG. 3 illustrates a cross sectional view of the protected cable connector assembly 100, in accordance with various embodiments of the present disclosure. The protected cable connector assembly 100 provides housing for optical fibre cable connector. In general, optical fibre connector terminates end of an optical fibre cable, and enables rapid connection and disconnection. The protected cable connector assembly 100 connects end of first optical fibre cable with second optical fibre cable. In addition, the protected cable connector assembly 100 mechanically couples and aligns the cores of fibres so light can pass. Further, the protected cable connector assembly 100 ensures proper alignment of the fibres to minimize loses. Furthermore, the protected cable connector assembly 100 enables optical connection of fibres of the first optical fibre cable with fibres of the second optical fibre cable or cables. Moreover, the protected cable connector assembly 100 ensures maximum axial alignment of respective fibre pairs. Also, the protected cable connector assembly 100 is characterized by a diameter. The diameter is overall diameter of circular cross section of the protected cable connector assembly 100. In addition, the diameter is largest external diameter of cross-section of the protected cable connector assembly 100. Further, the diameter of the protected cable connector assembly 100 is about 20.4 millimeter (as shown in FIG. 5). In an embodiment of the present disclosure, the protected cable connector assembly 100 has any suitable value of diameter.

Further, the protected cable connector assembly 100 facilitates to terminate optical fibre cable into a distribution enclosure. The protected cable connector assembly 100 ensures proper alignment of optical fibre cable with the distribution enclosure to minimize losses. In addition, the protected cable connector assembly 100 enables pairing of connector and adapter. The connector adapter pairing ensures proper alignment of optical fibre cable with the distribution enclosure to minimize losses. The optical fibre cable connector assembly 100 provides water proof housing to cable connector. The protected cable connector assembly 100 provides environmentally robust housing for cable connector. In addition, the protected optical fibre cable connector housing 100 provides strain relief to the optical fibre cable.

The protected cable connector assembly 100 includes a plurality of elements. The protected cable connector assembly 100 includes a cable gland body 102, a gland nut 104, a grommet 106 and a protected connector 108. Further, the protected cable connector assembly 100 includes an optical fibre cable 110, an adapter 112, a fibre distribution box 114 and a protective grip 116. The plurality of elements of the protected cable connector assembly 100 enable improvement in a plurality of characteristics of the protected connector 108. The plurality of properties of the protected connector 108 includes mechanical characteristics, optical characteristics and physical characteristics.

In an embodiment of the present disclosure, the plurality of characteristics includes any suitable characteristics of the like.

The protected cable connector assembly 100 includes the cable gland body 102. In general, cable gland corresponds to a component designed to attach and secure one end of an optical cable to any equipment. The cable gland body 102 is characterized by a first substantially cylindrical cross section. The cable gland body 102 is hollow cylindrical body. The first substantially cylindrical cross section of the cable gland body 102 is hollow cylindrical body. In addition, the first substantially cylindrical cross section of the cable gland body 102 includes a first threaded portion and a second threaded portion. Further, the first substantially cylindrical cross section of the cable gland body 102 includes an unthreaded portion. The first threaded portion is at first end of the first substantially cylindrical cross section of the cable gland body 102. The first threaded portion corresponds to external threads over periphery of the first substantially cylindrical cross section of the cable gland body 102. The second threaded portion is at a second end of the first substantially cylindrical cross section of the cable gland body 102. The second threaded portion corresponds to external threads over periphery of the first substantially cylindrical cross section of the cable gland body 102. The unthreaded portion of the cable gland body 102 corresponds to central non-threaded portion between the first threaded portion and the second threaded portion.

The cable gland body 102 is characterized by an inner diameter and an outer diameter. The inner diameter is diameter of internal hollow cylindrical cross section of the cable gland body 102. The outer diameter is external diameter of cylindrical cross section of the cable gland body 102. The cable gland body 102 is characterized by a first length, a second length and a third length. The first length is length of the first threaded portion of the cable gland body 102. The first length is measured from the first end of the cable gland body 102 to first end of the unthreaded portion. The second length is length of the unthreaded portion of the cable gland body 102. The second length is measured from the second end of the cable gland body 102 to second end of the unthreaded portion. The third length is length of the second threaded portion of the cable gland body 102.

The third length of the cable gland body 102 is about 10 millimeters. In an embodiment of the present disclosure, the cable gland body 102 has any suitable value of third length. The sum of the first length, the second length and the third length is total length of the cable gland body 102. The total length of the cable gland body 102 is about 55 millimeters. In an embodiment of the present disclosure, the cable gland body 102 has any suitable value of the total length (as shown in FIG. 5).

The protected cable connector assembly 100 incudes the gland nut 104. In general, gland nut corresponds to a nut for fastening on cable glands to enable a secure connection for the optical fibre cable. The gland nut 104 is characterized by a second substantially cylindrical cross section. The second substantially cylindrical cross section of the gland nut 104 is hollow cylindrical cross section. The gland nut 104 includes internal threads. The gland nut 104 is characterized by an inner diameter, an outer diameter and a total length. The inner diameter is diameter of internal hollow cylindrical cross section of the gland nut 104. The outer diameter is external diameter of cylindrical cross section of the gland nut 104. The inner diameter of the gland nut 104 is comparable to external diameter of the cable gland body 102. The total length is length of the gland nut 104. The length of the gland nut 104 is about 17.87 millimeter. In an embodiment of the present disclosure, the gland nut 104 has any suitable value of total length (as shown in FIG. 5).

Further, an internal threads of the gland nut 104 are corresponding to threads of the first threaded portion of the cable gland body 102. The internal threads of the gland nut 104 engage with threads of the first threaded portion of the cable gland body 102. The gland nut 104 is fastened on the cable gland body 102 with facilitation of threads. The gland nut 104 is fastened on the cable gland body 102 to ensure firm grip on the optical fibre cable 110. The gland nut 104 is fastened on the cable gland body 102 to ensure optical connection between the optical fibre cable 110 and the fibre distribution box 114. In an embodiment of the present disclosure, the gland nut 104 is fastened on the cable gland body 102 with facilitation of any suitable fastening mechanism of the like.

The protected cable connector assembly 100 includes the grommet 106. The grommet 106 is positioned partially inside the cable gland body 102. In general, grommet is a tube or ring like structure through which an optical cable passes. In addition, the grommet 106 facilitates the protected cable connector assembly 100 to firmly hold the optical fibre cable 110. Further, the grommet 106 is positioned partially inside the first end of the cable gland body 102. Furthermore, the grommet 106 seals the first end of the cable gland body 102 as the gland nut 104 is fastened on the first threaded portion of the cable gland body 102. Moreover, the grommet 106 enable a firm grip over the optical fibre cable 110 as the gland nut 104 is fastened on the first threaded portion of the cable gland body 102. Also, the grommet 106 is of a cylindrical shape with a hollow circular cavity. The cylindrical shape of the grommet 106 is characterized by an outer diameter and an inner diameter. The outer diameter is diameter of outer periphery of cylindrical shape of the grommet 106. The inner diameter is diameter of the hollow circular cavity in the cylindrical shape of the grommet 106.

The outer diameter of the grommet 106 is comparable to inner diameter of the cable gland body 102. In an embodiment of the present disclosure, the grommet 106 has any suitable outer diameter. The inner diameter of the grommet 106 is comparable to diameter of the optical fibre cable 110. The grommet 106 is compressed as the gland nut 104 is fastened on the first threaded portion of the cable gland body 102. In addition, the grommet 106 is compressed to a suitable degree of compression. The suitable degree of compression is achieved and adjusted with facilitation of the gland nut 104. The gland nut 104 is fastened or looseness on the cable gland body 102 to adjust the suitable degree of compression. In an embodiment of the present disclosure, the grommet 106 is formed of rubber. In another embodiment of the present disclosure, the grommet 106 is formed of any suitable compressible material of the like. In yet another embodiment of the present disclosure, the grommet 106 is formed of any suitable material of the like.

The protected cable connector assembly 100 includes the protected connector 108. In general, a connector terminates end of an optical fibre cable and mechanically couples and aligns cores of optical fibre. The protected connector 108 terminates end of the optical fibre cable 110 to enable optical coupling with the fibre distribution box 114. The protected connector 108 is characterized by negligible transmission loss due to reflection or misalignment of the fibres. The protected connector is affixed to a first end of the optical fibre cable 110. The protected connector 108 is a lucent connector. In an embodiment of the present disclosure, the protected connector 108 is a subscriber connector or square connector or standard connector. In another embodiment of the present disclosure, the protected connector 108 is multiple fibre push-on connector. In yet another embodiment of the present disclosure, the protected connector 108 is any suitable connector of the like.

In an embodiment of the present disclosure, the protected connector 108 is a factory fitted connector. In another embodiment of the present disclosure, the protected connector 108 is a field fitted connector. In yet another embodiment of the present disclosure, the protected connector 108 is any suitable connector of the like. The protected connector 108 enables the optical fibre cable 110 to easily terminate into the fibre distribution box 114. In addition, the protected connector 108 enables the optical fibre cable 110 to terminate into the fibre distribution box 114. Further, the protected connector 108 is a universal connector. Furthermore, the protected connector 108 is easily affixed with fibre distribution box 114. Moreover, the protected connector 108 is compatible with a plurality of distribution boxes. Also, the protected connector 108 is a low cost connector.

The protected cable connector assembly 100 includes the optical fibre cable 110. In general, optical cable is an assembly containing one or more optical fibres that are used to carry light. The optical fibre cable 110 is used for different applications. The different applications include long distance telecommunication, data transmission, and providing a high-speed data connection and the like. The optical fibre cable 110 is terminated into the fibre distribution box 114. The optical fibre cable 110 comprising a first open end.

The first open end of the optical fibre cable 110 is terminated into the fibre distribution box 114. The protected connector 108 is affixed at the first open end of the optical fibre cable 110. The protected connector 108 aligns the optical fibre cable 110 with optical transmission element of the fibre distribution box 114. The protected connector 108 ensures minimum transmission losses in termination of the optical fibre cable 110.

The optical fibre cable 110 is characterized by a substantially circular cross section. The optical fibre cable 110 is characterized by an outer diameter. The outer diameter is diameter of periphery of circular cross section of the optical fibre cable 110. The outer diameter of the optical fibre cable 110 is comparable to the inner diameter of the grommet 106. The optical fibre cable 110 is received through the grommet 106 into the cable gland body 102. The optical fibre cable 110 is received through the grommet 106 when gland nut 104 is loose. The gland nut 104 is fastened on the cable gland body 102 to enable the grommet 106 to completely seal and grip the optical fibre cable 110. The gland nut 104 is fastened on the cable gland body 102 to ensure firm grip of cable grommet 106 on the optical fibre cable 110.

The protected connector assembly 100 includes the adapter 112 and the fibre distribution box 114. The fibre distribution box 114 includes the adapter 112. In general, distribution box provides optical cable interconnections between communication facilities, and integrates fibre splicing, fibre termination, fibre optic adapters and connectors and cable connections together in a single unit. In an embodiment of the present disclosure, the fibre distribution box 114 includes a plurality of adapters 112. The adapter 112 facilitates in termination of the optical fibre cable 110 into the fibre distribution box 114. The optical fibre cable 110 is affixed with the protected connector 108. The protected connector 108 engages with the adapter 112 to enable termination of the optical fibre cable 110. The adapter 112 is characterized by a cross sectional shape. The cross sectional shape of the adapter 112 is corresponding to shape of the protected connector 108. The protected connector 108 slides and fits into the adapter 112.

The fibre distribution box 114 includes hollow cylindrical protrusions at one or more positions. The hollow cylindrical protrusion at each of the one or more positions is characterized by an inner diameter. The inner diameter of the hollow cylindrical protrusion at each of the one or more positions is internal diameter of the hollow cylinder. The inner diameter of the hollow cylindrical protrusion at each of the one or more positions is comparable to the outer diameter of the second threaded portion. The hollow cylindrical protrusion at each of the one or more positions includes internal threads. The second threaded portion of the cable gland body 102 is fastened on the internal threads of the hollow cylindrical protrusion. The second threaded portion of the cable gland body 102 engages with the internal threads of hollow cylindrical protrusion of the fibre distribution box. The cable gland body 102 is fastened with the fibre distribution box 114 to enable engagement of the protected connector 108 and the adapter 112.

The protected connector 108 engages with the adapter 112 within a protective housing. The protective housing is enabled by the cable gland body 102, the cable nut 104, the grommet 106, the adapter 112 and the fibre distribution box 114. The cable gland body 102 is fastened with the fibre distribution box 114 to enable the protective housing for the protected connector 108. The protective housing acts as ruggedized housing of the protected connector 108. The protective housing of the protected connector 108 is water proof housing. The protective housing of the protected connector 108 is environmentally robust housing. The protective housing of the protected connector 108 is weather proof. The protective housing of the protected connector 108 enable safe and secure termination of the optical fibre cable 110 into the fibre distribution box 114. The protective housing of the protected connector 108 eliminates transmission losses occurring during termination of the optical fibre cable 110. The protective housing of the protected connector 108 is ruggedized shell.

Figure 6:
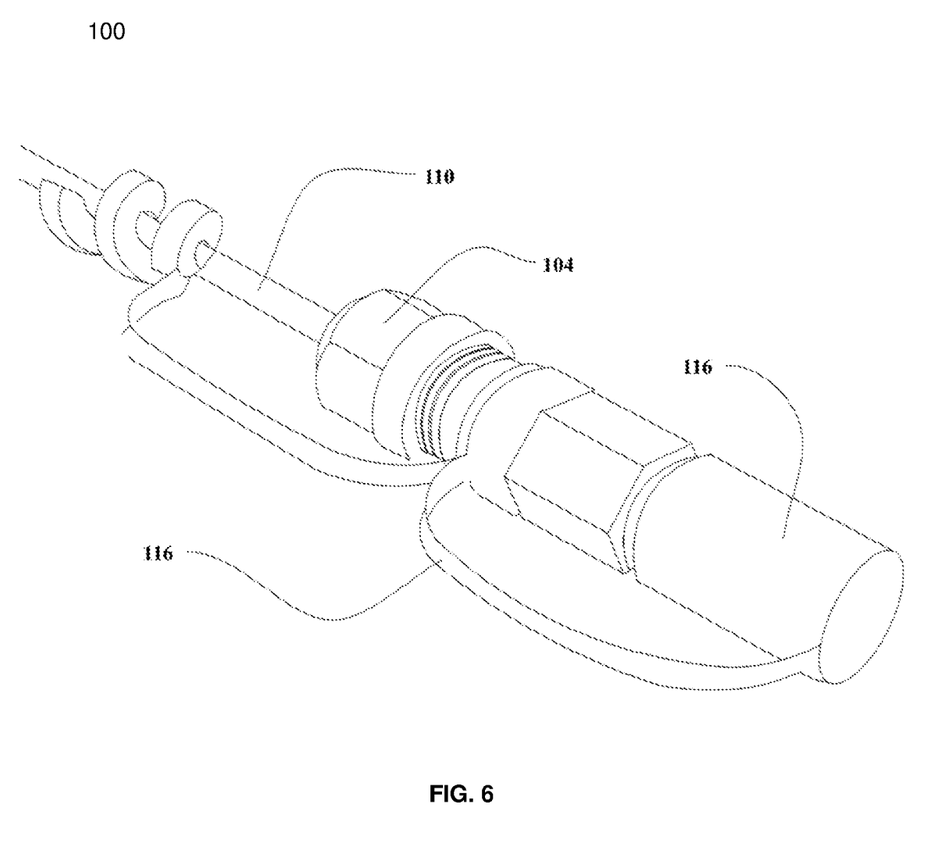
FIG. 6 illustrates a cross sectional view of the protected cable connector assembly with a protective grip, in accordance with an embodiment of the present disclosure.

FIG. 6 illustrates cross sectional view of the protected cable connector assembly 100 with the protective grip 116, in accordance with another embodiment of the present disclosure. The protected cable connector assembly 100 includes the protective grip 116. The protective grip 116 is protection and safety cover of the protected cable connector assembly 100. The protective grip 116 is a robust outer covering of the protected cable connector assembly 100. The protective grip 116 prevents components from slipping down from the protected cable connector assembly 100. The protective grip 116 prevents components of the protected cable connector assembly 100 from slipping down the optical fibre cable 110. In an embodiment of the present disclosure, the protective grip 116 enables any suitable characteristics of the like.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

We claim:

1. A protected cable connector assembly comprising:
a cable gland body, wherein the cable gland body is a hollow cylindrical body, wherein the cable gland body comprises a first threaded portion, a second threaded portion and an unthreaded portion, wherein the first threaded portion corresponds to external threads over periphery of a first substantially cylindrical cross section of the cable gland body, wherein the second threaded portion is at a second end of the first substantially cylindrical cross section of the cable gland body, wherein the second threaded portion corresponds to external threads over periphery of the first substantially cylindrical cross section of the cable gland body, wherein the unthreaded portion of the cable gland body corresponds to central non-threaded portion between the first threaded portion and the second threaded portion;
a gland nut, wherein the gland nut is a hollow cylindrical body, the gland nut comprises internal threads, wherein the internal threads of the gland nut engage with threads of the first threaded portion of the cable gland body, wherein the gland nut is characterized by a total length, wherein the total length of the gland nut is 17.87 millimeters;
a grommet, wherein the grommet is positioned partially inside the cable gland body, wherein the grommet facilitates the protected cable connector assembly to hold an optical fibre cable firmly, wherein the grommet is positioned partially inside the first end of the cable gland body, wherein the grommet seals the first end of the cable gland body as the gland nut is fastened on the first threaded portion of the cable gland body, wherein the grommet has a cylindrical shape with a hollow circular cavity;
the protected connector, wherein the protected connector is affixed at a first open end of the optical fibre cable, wherein the protected cable connector enables the optical fibre cable to terminate into an optical fibre distribution box, the protected connector is affixed to a first end of the optical fibre cable;

the optical fibre cable, wherein the optical fibre cable comprising the first open end, wherein the first open end of the optical fibre cable is terminated into the fibre distribution box, wherein the protected connector is affixed at the first open end of the optical fibre cable, wherein the protected connector aligns the optical fibre cable (110) with optical transmission element of the fibre distribution box; and a protective grip, wherein the protective grip is a robust outer covering of the protected cable connector assembly, wherein the protective grip prevents components of the protected cable connector assembly from slipping down the optical fibre cable, wherein the protected cable connector assembly ensures proper alignment of the optical fibre cable to minimize optical loses, wherein the protected cable connector assembly ensures efficient axial alignment of optical fibres of the optical fibre cable, wherein the protected cable connector assembly is characterized by a diameter, wherein the diameter of the protected cable connector assembly is 20.4 millimeters, wherein the protected cable connector assembly enables improvement in a plurality of characteristics of the protected connector, wherein the plurality of properties of the protected connector comprises mechanical characteristics, optical characteristics and physical characteristics.

2. The protected cable connector assembly as claimed in claim 1, wherein the protected cable connector assembly further comprising the fibre distribution box, wherein the fibre distribution box comprises an adapter, wherein the adapter facilitates termination of the optical fibre cable into the fibre distribution box.

3. The protected cable connector assembly as claimed in claim 1, wherein the cable gland body is fastened with the fibre distribution box for enabling engagement of the protected connector and an adapter.

4. The protected cable connector assembly as claimed in claim 1, wherein the optical fibre cable is received through the grommet into the cable gland body, wherein the optical fibre cable is received through the grommet when the gland nut is loose, wherein the gland nut is fastened on the cable gland body to enable the grommet to completely seal and grip the optical fibre cable.

5. The protected cable connector assembly as claimed in claim 1, wherein the cable gland body is fastened with the fibre distribution box for enabling a protective housing for the protected connector, wherein the protective housing of the protected connector eliminates transmission losses occurring during termination of the optical fibre cable.

6. The protected cable connector assembly as claimed in claim 1, wherein the cable gland body is characterized by a first length, a second length and a third length, wherein the first length is length of the first threaded portion of the cable gland body, wherein the first length is measured from the first end of the cable gland body to first end of the unthreaded portion, wherein the second length is length of the unthreaded portion of the cable gland body, wherein the second length is measured from the second end of the cable gland body to second end of the unthreaded portion, wherein the third length is length of the second threaded portion of the cable gland body, wherein the first length of the cable gland body is 17.87 millimeters, wherein the third length of the cable gland body is 10 millimeters, wherein sum of the first length, the second length and the third length is a total length of the cable gland body, wherein the total length of the cable gland body is 55 millimeters.

7. The protected cable connector assembly as claimed in claim 1, wherein the protected connector is characterized by negligible transmission loss due to reflection or misalignment of optical fibres, wherein the protected connector aligns the optical fibre cable with optical transmission element of the fibre distribution box.

* * * * *